United States Patent
Jang et al.

(10) Patent No.: US 8,530,078 B2
(45) Date of Patent: Sep. 10, 2013

(54) SECONDARY BATTERY

(75) Inventors: Youngcheol Jang, Yongin-si (KR);
Kyungwon Seo, Yongin-si (KR);
Jeongdeok Byun, Yongin-si (KR);
Eunok Kwak, Yongin-si (KR)

(73) Assignee: Samsung SDI, Co., Ltd., Yongin-si, Gyeonggi-do (KR)

( * ) Notice: Subject to any disclaimer, the term of this patent is extended or adjusted under 35 U.S.C. 154(b) by 743 days.

(21) Appl. No.: 12/254,164

(22) Filed: Oct. 20, 2008

(65) Prior Publication Data

US 2009/0130554 A1    May 21, 2009

(30) Foreign Application Priority Data

Nov. 19, 2007    (KR) ................ 2007-118053

(51) Int. Cl.
*H01M 2/02*    (2006.01)

(52) U.S. Cl.
USPC .......................................................... 429/179

(58) Field of Classification Search
USPC .......................................................... 429/179
See application file for complete search history.

(56) References Cited

U.S. PATENT DOCUMENTS

| | | | | |
|---|---|---|---|---|
| 7,763,379 | B2 * | 7/2010 | Moon et al. | 429/163 |
| 2006/0046139 | A1 | 3/2006 | Suzuki et al. | |
| 2006/0210870 | A1 | 9/2006 | Moon et al. | |
| 2008/0118825 | A1 * | 5/2008 | Yoon | 429/122 |

FOREIGN PATENT DOCUMENTS

| | | |
|---|---|---|
| CN | 101069301 A | 11/2007 |
| KR | 1020050103521 A | 10/2005 |
| KR | 1020050113985 A | 12/2005 |
| KR | 1020040028776 * | 1/2006 |
| KR | 1020060050550 A | 5/2006 |
| KR | 10-0647568 | 11/2006 |
| KR | 10-2007-0101566 | 10/2007 |
| KR | 10-0791551 | 12/2007 |
| KR | 10-0836775 | 6/2008 |

OTHER PUBLICATIONS

English-language Abstract of KR 10-2001-0048099.
English-language Abstract of KR 10-2007-0074677.
Chinese Office Action dated Feb. 2, 2012 issued by the SIPO for corresponding Chinese Patent Application No. 200810167379.X, 12 pages.
The Notification of the Third Office Action, issued by the State Intellectual Property Office of P.R. China, dated Oct. 9, 2012 in Application No. 200810167379.X, 9 pages.

* cited by examiner

*Primary Examiner* — Karie O'Neill Apicella
(74) *Attorney, Agent, or Firm* — Knobbe Martens Olson & Bear, LLP

(57) ABSTRACT

A secondary battery includes grooves formed in a cap plate into which conducting support members are disposed allowing for the exact connection of a protection circuit board to a predetermined position of the battery. The secondary battery includes: an electrode assembly; a can to house the electrode assembly; a cap assembly; a protection circuit board electrically coupled to an electrode terminal of the cap assembly; and a conducting support member connected to a groove formed in the cap plate and soldered to the protection circuit board. The protection circuit board is electrically and mechanically connected to the groove formed in the cap plate, thereby allowing the protection circuit board to be exactly connected to a predetermined position of the cap plate.

19 Claims, 6 Drawing Sheets

SECONDARY BATTERY

CROSS-REFERENCE TO RELATED APPLICATIONS

This application is based on and claims priority to Korean Patent Application No. 2007-118053 filed on Nov. 19, 2007 in the Korean Intellectual Property Office (KIPO), the entire contents of which are hereby incorporated by reference.

BACKGROUND OF THE INVENTION

1. Field of the Invention

Aspects of the present invention relate to a secondary battery, and more particularly, to a secondary battery that can exactly connect a protection circuit board to a predetermined position of the battery.

2. Description of the Related Art

Compact and light-weighted portable electronic devices, such as a cellular phone, a notebook computer and a camcorder, etc., have been actively developed and produced. Such portable electronic devices include a built-in battery pack so as to be operable without a separate power supply. The battery pack is equipped with a secondary battery that can be charged/discharged. Typical secondary batteries are a nickel-cadmium (Ni—Cd) battery, a nickel-hydrogen (Ni-MH) battery, a lithium (Li) battery, and a lithium ion (Li-ion) secondary battery, etc. Especially, the lithium ion secondary battery has an operating voltage that is three times that of the nickel-cadmium (Ni—Cd) battery or the nickel-hydrogen(Ni-MH) battery, which are usually used as power supplies for the portable electronic devices. In addition, the lithium ion secondary battery has been widely used because the lithium ion secondary battery has higher energy density per unit weight.

The lithium ion secondary battery uses a lithium group oxide as a cathode active material, and a carbonic material as an anode active material. Generally, secondary batteries are divided into a liquid electrolyte battery and a polymer electrolyte battery, depending on a kind of an electrolyte. A lithium ion battery uses a liquid electrolyte, and a lithium polymer battery uses a polymer electrolyte.

The secondary battery controls matters about charge/discharge when it is charged or discharged. A protection circuit board is electrically and mechanically combined with the secondary battery so as to disconnect current flow of the charge/discharge in cases of overheating and overcurrent. For example, the protection circuit board is electrically and mechanically combined with a cap plate of the secondary battery.

In the conventional secondary battery, there is a problem that the position of the protection circuit board is easily changed during a combining process as the protection circuit board is simply placed on the flat cap plate and combined therewith. That is, the protection circuit board seated on the flat cap plate easily becomes loose by assembling errors or small external impacts. Thus, positions of the protection circuit boards between completed secondary batteries are somewhat different from each other. Sometimes, the position of the protection circuit board is too much changed such that the completed secondary battery cannot be mounted in an electronic device.

SUMMARY OF THE INVENTION

Accordingly, aspects of the present invention provide a secondary battery that can exactly connect, electrically and mechanically, a protection circuit board to a predetermined position of the battery.

According to an aspect of the present invention, there is provided a secondary battery, which includes: an electrode assembly including a cathode plate, an anode plate and a separator disposed to insulate the cathode plate from the anode plate, wherein the cathode plate, the anode plate, and the separator are wound together; a can to house the electrode assembly and having an open end; a cap assembly including a cap plate to seal the opened end of the can and having grooves formed therein disposed at opposing ends of the cap plate, and an electrode terminal disposed to extend through the cap assembly and to electrically connect to the anode plate, the electrode terminal being insulated from the cap plate; a protection circuit board electrically coupled to the electrode terminal and having a charging/discharging terminal on an upper surface thereof; and a conducting support member connected to one of the grooves formed in the cap plate and soldered to the protection circuit board.

According to an aspect of the present invention, a hole may be formed in the middle of the protection circuit board and an anode combining member may be connected to the hole so as to cover the hole, and the anode combining member may be connected to the electrode terminal. According to an aspect of the present invention, a height of the conducting support member may be higher than a sum of heights of the anode combining member and electrode terminal.

According to an aspect of the present invention, the conducting support member may include a first region connected to the protection circuit board; a second region bent and extended from the first region; and a third region extended and bent from the second region and connected to the groove of the cap plate, where the first region may be bent in a first direction about the second region and the third region may be bent in a second direction opposite to the first direction.

According to an aspect of the present invention, the third region of the conducting support member may be formed in flat rectangular or arc shape and the groove formed at the cap plate may be formed in a rectangular or a semi-circular shape.

According to an aspect of the present invention, the conducting support member may be made of nickel or nickel-containing alloy. According to an aspect of the present invention, a laser welding part may be formed at the conducting support member connected to the groove. According to an aspect of the present invention, the laser welding part may be formed in a shape of plural spots on an upper surface of the conducting support member seated in the groove.

According to an aspect of the present invention, the secondary battery may further include a cover case provided with a charging/discharging terminal hole for exposing the charging/discharging terminal and the cover case may cover the protection circuit board and conducting support member. According to an aspect of the present invention, a test terminal may be formed in the protection circuit board and a test terminal hole may be further formed in the cover case so as to expose the test terminal.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
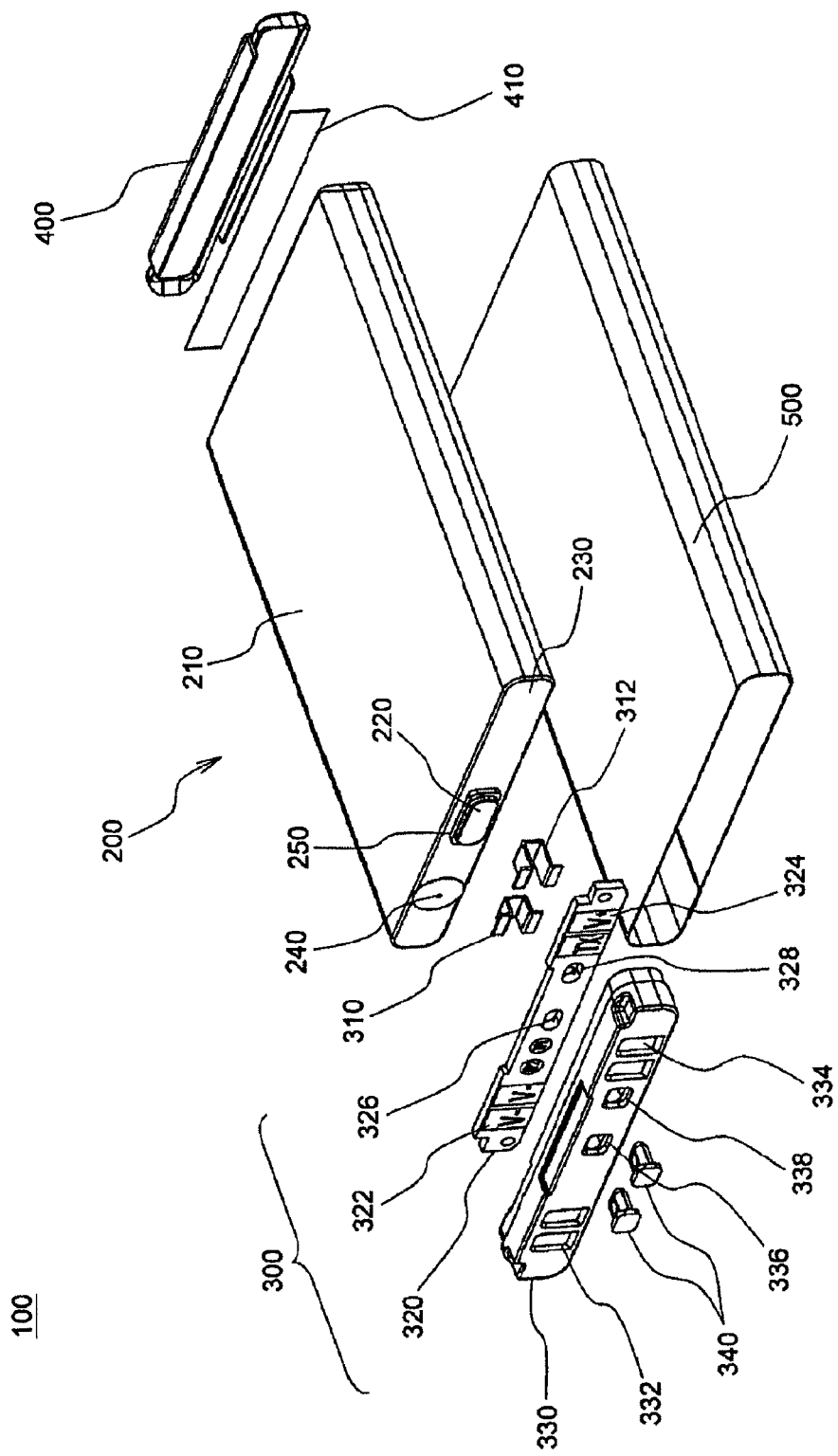
FIG. 1 is an exploded perspective view illustrating a secondary battery according to an exemplary embodiment of the present invention.

Reference will now be made in detail to the present embodiments of the present invention, examples of which are illustrated in the accompanying drawings, wherein like reference numerals refer to the like elements throughout. The embodiments are described below in order to explain the aspects of the present invention by referring to the figures. It will be understood that when an element is referred to as being "connected" or "coupled" to another element or "disposed on" another element, it may be directly connected or coupled to the other element or directly disposed on the other element or intervening elements may be present.

Referring to FIG. 1, a secondary battery 1000 may include an electrode assembly 100, a can 200, a cap assembly 300, a protection circuit board 400 and a support member 500. The electrode assembly 100 is formed by stacking a cathode plate 110 connected to a cathode tab 140, an anode plate 120 connected to an anode tab 150 and a separator 130 and winding them together.

The cathode plate 110 is formed of a cathode collector and a cathode active material layer. The cathode active material layer may include lithium, a binder to improve combined force, and a conductive material to improve conductivity. The cathode collector may be made of aluminum, allows for movement of charges generated from the cathode active material layer, and supports the layer of the cathode active material layer. The cathode active material layer is disposed on surfaces of the cathode collector. However, a portion of the cathode plate 110 remains uncoated (not shown), i.e., the cathode active material layer is not formed in such portion. The uncoated portion of the cathode plate 110 may be formed on one end of the cathode plate 110. The cathode tab 111 is bonded to the uncoated portion of the cathode plate 110.

The anode plate 120 includes an anode collector and an anode active material layer. The anode active material layer contains carbon and may be formed of hard carbon or graphite and a binder to improve binding force between active material particles. The anode collector may be made of copper, allows for movement of charges generated from the anode active material layer, and supports the anode active material layer. The anode active material layer is disposed on a surface of the anode plate 120. Here, a portion of the anode plate 120 remains uncoated (not shown), i.e., the anode active material layer is not formed in such portion. The uncoated portion of the anode plate 120 may be formed on one end of the anode plate 120. The anode tab 121 is bonded to the uncoated portion of the anode plate 120.

The separator 130 is disposed between the cathode plate 110 and the anode plate 120 so as to insulate the cathode plate 110 from the anode plate 120. The separator 130 permits hydrogen ions, but not free electrons, to pass from the anode plate 120 to the cathode plate 110. The separator 130 may be made of polyethylene (PE) or polypropylene (PP). The separator 130 made of such material may form pores and polymer electrolyte may be contained in the pores formed in the separator 130, but a material of the separator and a kind of polymer contained in the separator 130 are not limited thereto.

The can 200 may receive the electrode assembly 100 through one opened end of the can 200. Further, the can 200 may contain an electrolyte. A shape of the can 200 may be formed in angular or oval type according to a shape of the electrode assembly 100. The can 200 is combined by welding, etc., with a cap plate 310 after an insulation case 360 is received on an upper part of the electrode assembly 100. The can 200 is usually made of aluminum, but is not limited thereto.

The cap assembly 300 may include a cap plate 310, an electrode terminal 320, an insulation gasket 330, an insulation case 360, a terminal plate 340, and an insulation plate 350. First, a safety vent 313 and an electrolytic solution feeding hole stopper 312 to seal an electrolytic solution feeding hole 311 are formed through the cap plate 310. The cap plate 310 is coupled with the cathode tab 140 and seals the opened end of the can 200. A groove 314 may be formed oppositely on an upper surface of the cap plate 310. The groove 314 receives an end part of a support member 500 connected to the cap plate 310. Of the conducting support members 500 illustrated in FIG. 1, one or both may be electrically connected to the cathode plate and the charging/discharging terminal 420 despite both being described as conducting support members 500 throughout. The end part of the conducting support member 500 may be bent so as to form a combining surface that can be connected to the groove 314.

The electrode terminal 320 is seated in the central hole of the cap plate 310 and electrically coupled with the anode tab 150. The insulation gasket 330 insulates the electrode terminal 320 from the cap plate 310. The insulation case 360 includes holes through which the cathode tab 140 and anode tab 150 individually pass, and the insulation case 360 is seated on the upper part of the electrode assembly 100 so as to insulate an upper surface of the electrode assembly 100. The terminal plate 340 provides a hole through which an end part of the electrode terminal 320 is pressed and fixed. The insulation plate 350 insulates the terminal plate 340 from the cap plate 310. The insulation gasket 330, insulation case 360, and insulation plate 350 may be formed of insulating materials, such as polypropylene resin or polyethylene resin. The electrode terminal 320, cap plate 310, and terminal plate 340 may be formed of conductive metal materials, such as aluminum or aluminum-containing alloy, or nickel or nickel-containing alloy, but the electrode terminal 320, cap plate 310, and terminal plate 340 are not limited thereto.

The protection circuit board 400 may include a protection circuit part (not shown), a test terminal 410, and a charging/discharging terminal 420. A cathode of the protection circuit board 400 is combined with the cap plate 310, and an anode of the protection circuit board 400 may be electrically coupled with the electrode terminal 320. The anode of the protection circuit board 400 may be electrically coupled with the electrode terminal 320 by soldering or welding, or by using a conductive binding member, such as an electro-conductive wire, but is not limited thereto. Further, a terminal pattern 401 electrically coupled with the conducting support member 500 may be formed on the protection circuit board 400 and the terminal pattern 401 and the conducting support member 500 may be electrically connected by soldering.

The protection circuit part (not shown) may include a passive member (not shown), an active member (not shown), and a protection circuit (not shown). The protection circuit part may be electrically soldered to a printed circuit pattern (not shown) formed on a surface of the protection circuit board 400. Here, the protection circuit is electrically coupled with the passive and active members and controls general conditions of the secondary battery. Further, the protection circuit may determine a remaining charge of the battery or charge/discharge the battery by selecting a proper charging method according to charging/discharging condition of the secondary battery. The protection circuit may further store information like voltage, current, temperature, remaining charge, conditions of the secondary battery, and may transmit the information to an external device. The protection circuit may be formed as an integrated circuit type in which a plurality of logic members and active/passive members are integrated.

A test terminal 410 is electrically coupled with the printed circuit pattern so as to determine whether the charging/discharging function or the protection circuit is normally operated.

The charging/discharging terminal 420 is electrically coupled with the printed circuit pattern so as to provide an electrical passage through which the secondary battery can be charged/discharged by a field effect transistor. The field effect transistor may be an active member to switch between charging and discharging, or the field effect transistor may be a protection circuit that is electrically coupled with a bipolar transistor and to control charging/discharging.

The conducting support member 500 is combined with the groove 314 formed in the cap plate 310 and soldered to the terminal pattern 401 of the printed circuit pattern formed on the protection circuit board 400. The conducting support member 500 is strongly combined with the protection circuit board 400 by soldering so as to support the protection circuit board 400. Further, the conducting support member 500 is combined with the groove 314 formed in the cap plate 310 and the protection circuit board 400 simultaneously. More particularly, the conducting support member 500 may include a first region 510 connected to the protection circuit board 400, a second region 520 bent and extended from the first region 510, and a third region 530 extended and bent from the second region 520 and connected to the groove 314 of the cap plate 310. Thus, the conducting support member 500 can be easily combined with the protection circuit board 400 and the cap plate 310 respectively by the first and third regions 510 and 530. The third region 530 of the conducting support member 500 is inserted into the groove 314 and may be strongly combined with the groove 314 by laser welding.

The third region 530 of the conducting support member 500 may be formed having an angular shape. In addition, the groove 314 formed at the cap plate 310 may be formed similarly to the third region 530 and having an angular shape. Thus, the third region 530 and groove 314 can be combined with each other with minimum assembling error.

The secondary battery 1000 can have spare length as long as an end part of the conducting support member 500, i.e., the third region 530, is inserted into the groove 314 formed in the cap plate 310. A position for fitting the conducting support member 500 can be determined by the groove 314. That is, the position where the conducting support member 500 is seated on the upper surface of the cap plate 310 can be constantly maintained due to the combination of the groove 314 and the conducting support member 500.

Figure 2A:
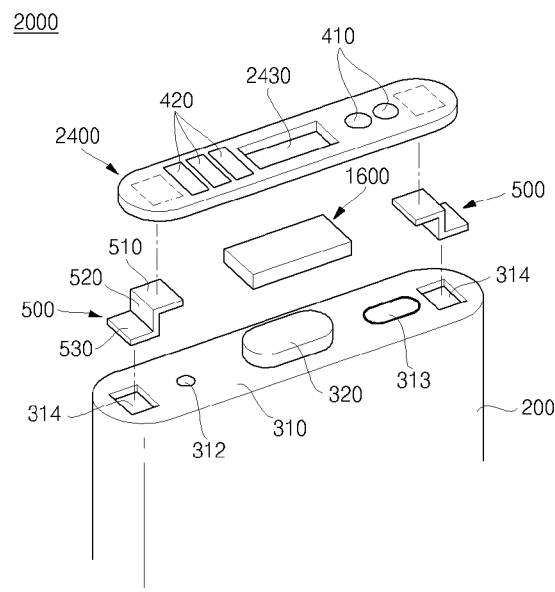
FIG. 2A is an exploded perspective view illustrating partially exploded a secondary battery according to an exemplary embodiment of the present invention.

FIG. 2A is a partially exploded perspective view illustrating a secondary battery according to an exemplary embodiment of the present invention.

Figure 2B:
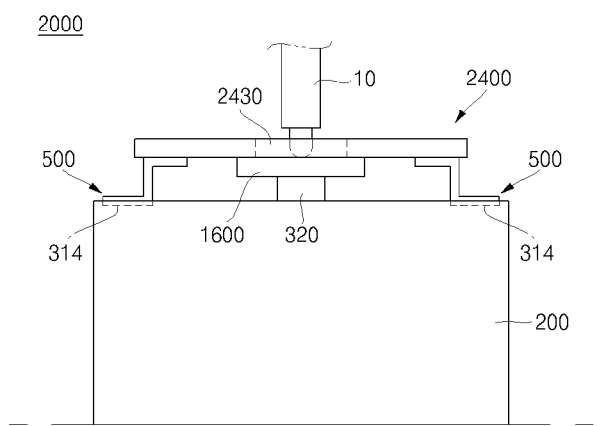
FIG. 2B is a front view illustrating the secondary battery of FIG. 2A.
Figure 2C:
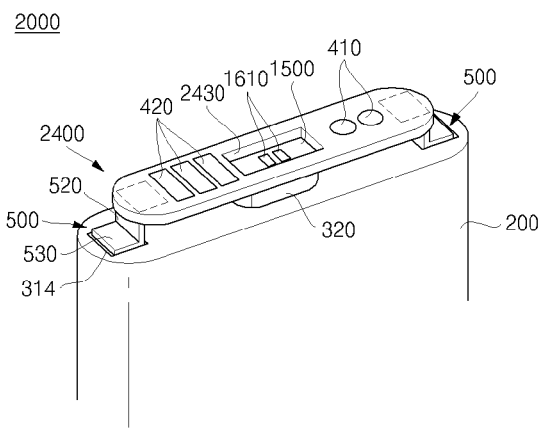
FIG. 2C is a perspective view of FIG. 2B.

Referring to FIG. 2A, an electrode assembly received in a can is sealed by a cap assembly. FIG. 2B is a front view illustrating the secondary battery of FIG. 2A. FIG. 2C is a perspective view of FIG. 2B.

Referring to FIG. 2A to FIG. 2C A secondary battery 2000 may include an electrode assembly (not shown), a can 200, a cap assembly 300, a protection circuit board 2400, a conducting support member 500, and a combining member 1600. Here, the electrode assembly, the can 200, the cap assembly 300, and the conducting support member 500 are substantially the same as those described in FIG. 1; thus, the explanation will be omitted. A relation of combining the protection circuit board 2400 with an electrode terminal 320 will be explained.

A central hole 2430 is formed in the protection circuit board 2400, and the combining member 1600 is disposed between the electrode terminal 320 and the protection circuit board 2400 to cover the central hole 2430, and the combining member 1600 connected to the central hole 2430 may form a welding part with the electrode terminal 320.

Further, the combining member 1600 may be combined with the central hole 2430 of the protection circuit board 2400 so as to be electrically coupled with a printed circuit board (not shown) of the protection circuit board 2400. The combining member 1600 may be combined with a thick part around the central hole 2430 formed in the protection circuit board 2400 by insertion, or may be combined with any one of surfaces of upper and lower parts of the protection circuit board 2400 by soldering, etc. An electro-conductive film (not shown) made of copper may be formed on a surface of the protection circuit board 2400 combined with the combining member 1600, and the electro-conductive film and the combining member 1600 may be electrically coupled and simultaneously combined with each other by soldering, etc. The combining member 1600 may be combined with the electrode terminal 320 by welding or soldering and may be combined with the protection circuit board 2400 by electrical coupling or soldering, etc.

Referring to FIG. 2B, an example of combining the combining member 1600 with the electrode terminal 320 by welding will be explained below. After a surface of the combining member 1600 combined with the protection circuit board 2400 is contacted to the electrode terminal 320, a welding rod 10 is passed through the central hole 2430 of the protection circuit board 2400. Then, the surface of the combining member 1600 is melted by the welding rod 10 so as to be combined with the electrode terminal 320. The welding method may include ultrasonic welding, covered arc welding, resistance welding and carbon dioxide welding, etc., but is not limited thereto.

Referring to FIG. 2C, an example of combining the combining member 1600 with the electrode terminal 320 by soldering will be explained below. After a lead receiving hole 1610 is formed in the combining member 1600, which is combined with the protection circuit board 2400, the electrode terminal 320 and the combining member 1600 may be combined with each other by soldering the electrode terminal 320 to the lead receiving hole 1610. The lead receiving hole 1610 may be additionally formed to improve a binding force between the combining member 1600 and the electrode terminal 320. The combining member 1600, which is combined by the welding or the soldering, may be formed in various shapes. The combining member 1600 may be bent at least once so as to make the combination of the protection circuit board 2400 and the electrode terminal 320 easy or reduce a space occupied by the combining member 1600. Thus, the combining member 1600 may be formed in various shapes according to a structure to be combined with a shape of the electrode terminal 320. The combining member 1600 has high conductivity and may be made of nickel or nickel-containing alloy having structurally stable strength, but is not limited thereto.

Figure 3A:
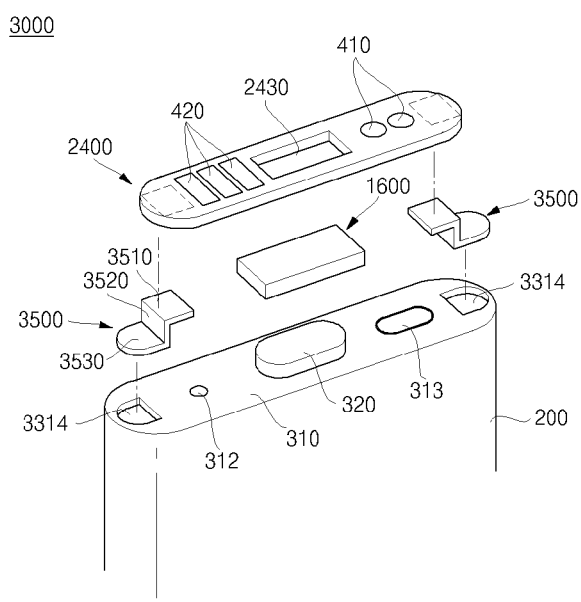
FIG. 3A is perspective view illustrating a partially exploded a secondary battery according to an exemplary embodiment of the present invention.
Figure 3B:
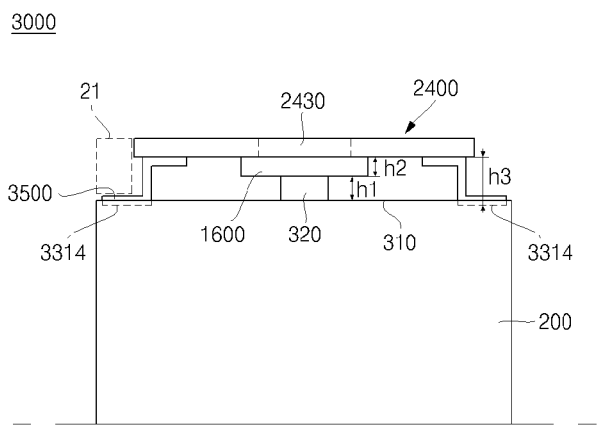
FIG. 3B is a front view illustrating the secondary battery of FIG. 3A.

FIG. 3A is a perspective view illustrating a partially exploded secondary battery according to an exemplary embodiment of the present invention. FIG. 3B is a front view illustrating the secondary battery of FIG. 3A and FIG. 3C is a plane view illustrating the secondary battery of FIG. 3B.

Figure 3C:
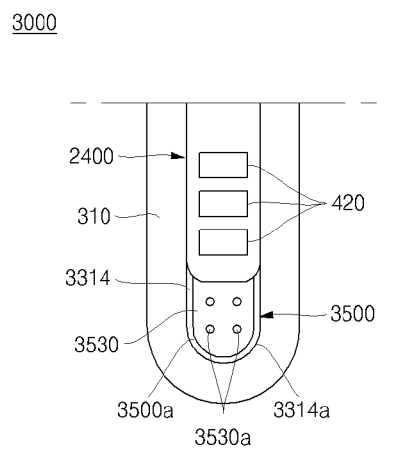
FIG. 3C is a plane view illustrating the secondary battery of FIG. 3B.

Referring to FIG. 3A to FIG. 3C, the secondary battery 3000 may include an electrode assembly (not shown), a can 200, a cap assembly (not shown), a protection circuit board 2400, a combining member 1600, and a conducting support member 3500. Here, the electrode assembly 100, the can 200, the cap assembly 300, the protection circuit board 2400, and the combining member 1600 are similar to those described in above embodiment; thus, explanation thereof will be omitted. In this embodiment, a construction of the conducting support member 3500 and a structure of combining the conducting support member 3500 with the cap plate 310 will be explained in detail.

With reference to FIG. 3B, height h3 of the conducting support member 3500 is formed higher than a sum of height h2 of the anode combining member 1600 and height h1 of the electrode terminal 3200. That is, the secondary battery 3000 is formed having a structure that stably combines the protection circuit board 2400 with the cap plate 310 without reduction of a total length of the secondary battery 3000. More specifically, height h3 of the conducting support member 3500 extends from a bottom surface of the groove 3314 in the cap plate 310 to a bottom surface of the protection circuit board 2400. The height h1 extends from a top surface of the cap plate 310 to a bottom surface of the anode combining member 1600. The height h2 extends from the bottom surface of the anode combining member 1600 to a top surface of the anode combining member 1600, which contacts the bottom surface of the protection circuit board 2400. Thus, the height h3 from the bottom surface of the groove 3314 to the bottom surface of the protection circuit board 2400 is greater than the sum of height h1 and height h2 from the top surface of the cap plate 310 to the bottom surface of the protection circuit board 2400.

With reference to FIG. 3A, the conducting support member 3500 includes a first region 3510 bent in a first direction from a second region 3520, and a third region 3530 bent in a second direction from the second region 3520. The first direction is disposed away from the second region 3520 toward the central hole 2430, and the third direction is disposed away from the second region 3520 toward a periphery of the cap plate 310. When the third region 3530 of the conducting support member 3500 is seated in a groove 3314, the conducting support member 3500 connected to the groove 3314 can be vertically welded. That is, the third region of the conducting support member 3500 is seated in the groove 3314 in the step shape; thus, a space for welding can be formed. Referring to FIG. 3B, in the space, the conducting support member 3500 is vertically welded by a welding rod 21. In other words, the vertical welding is possible because the conducting support member 3500 is formed in the step shape thereby creating the space for welding between the periphery of the cap plate 310 and an end of the protection circuit board 2400. Here, a laser welding may be used as the welding method, but the welding method is not limited thereto. Further, a portion where the conducting support member 3500 is electrically coupled with the protection circuit board 2400 may be soldered to a printed circuit pattern formed on the protection circuit board 2400 by using surface mount technology (SMT).

Further, as shown in FIG. 3C, when a portion of the groove 3314 is formed in a round shape, the third region 3530 of the conducting support member 3500 may be also formed in a round shape 3500a according to the shape of the round groove 3314. Thus, assembling error is reduced between the third region 3530 and groove 3314.

Also, a laser welding part 3530a is formed on the third region 3530 of the conducting support member 3500 seated in the groove 3314. In this case, the conducting support member 3500 and the groove 3314 of the cap plate 310 are welded to each other by laser welding.

The laser welding part 3530a may be in a shape of a plurality of spots on the upper surface of the conducting support member 3500 seated in the groove 3314. The shape of spots may be formed by spot-irradiating a laser at each point. The spot-shaped welding can weld the cap plate 310 to the conducting support member 3500 so as not to over-melt when the groove 314 and the conducting support member 3500 are combined.

The conducting support member 3500 may be made of nickel or nickel-containing alloy. The conducting support member 3500 made of such material has an improved conductivity as well as high strength; thus, the conducting support member 3500 made of such material has improved soldering performance with the protection circuit board 2400. Here, the cap plate 310 may be made of nickel or nickel-containing alloy. Or, the cap plate 310 may be made of aluminum or aluminum-containing alloy, but the cap plate 310 is not limited thereto.

Figure 4A:
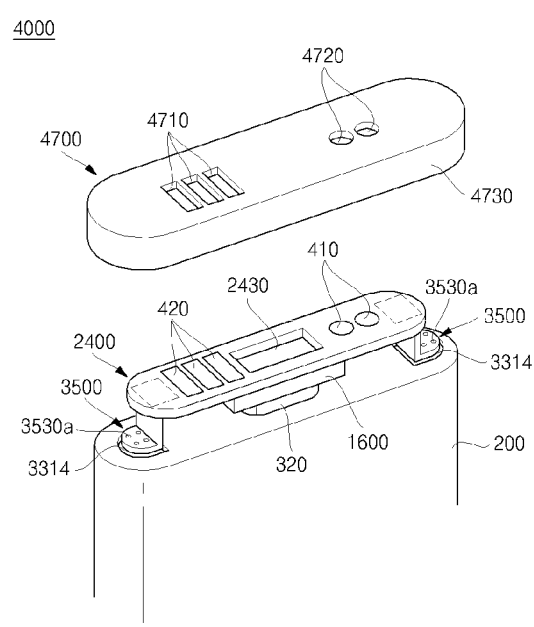
FIG. 4A is a partially exploded perspective view illustrating a secondary battery according to an exemplary embodiment of the present invention.
Figure 4B:
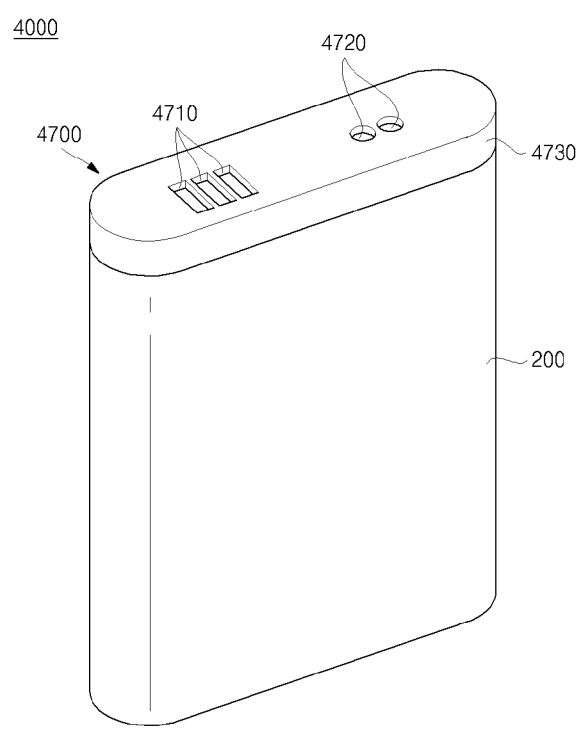
FIG. 4B is a plane view illustrating the secondary battery of FIG. 4A.

FIG. 4A is perspective view illustrating a partially exploded secondary battery according to an exemplary embodiment of the present invention. FIG. 4B is a plane view illustrating the secondary battery of FIG. 4A.

Referring to FIGS. 4A and 4B, the secondary battery 4000 may include an electrode assembly (not shown), a can 200, a cap assembly 300, a protection circuit board 2400, a conducting support member 3500, and a cover case 4700. Here, the electrode assembly, the can 200, the cap assembly 300, the protection circuit board 2400, and the conducting support member 3500 are substantially same as those described in above embodiment; thus, the explanation thereof will be omitted. In this embodiment, the cover case 4700 that covers the protection circuit board 2400 will be explained in detail.

The cover case 4700 may include a charging/discharging terminal hole 4710 to expose a terminal surface of a charging/discharging terminal 420 formed on the protection circuit board 2400. The cover case 4700, including the holes 4710, may cover an upper surface of the protection circuit board 2400 while exposing the terminal surface of the charging/discharging terminal 420 of the protection circuit board 2400. When the test terminal 410 of the protection circuit board 2400 is formed, the cover case 4700 may have a test terminal hole 4720 that exposes the test terminal 410 while covering the protection circuit board 2400.

The cover case 4700 may be formed by injected molding. The protection circuit board 2400 is protected from an impact and simultaneously insulated by the cover case 4700 formed of such injection molded material. Further, the cover case 4700 may be formed having a uniform thickness and include a side wall 4730 so as to surround a side surface of the protection circuit board 2400. The side wall 4730 surrounds the protection circuit board 2400 and simultaneously covers the conducting support member 3500; thus, the conducting support member 3500 is not electrically shorted. When the cover case 4700, including the side wall 4730, covers the protection circuit board 2400, the can 200 and the cover case 4700 are coupled to each other as shown in FIG. 4B. The cover case 4700 may be combined with the can 200 by surrounding surfaces of the side wall 4730 of the cover case 4700 and the can 200 with a label (not shown) having an adhesive force. Also, the cover case 4700 may be combined with the cap plate 310 by disposing an adhesive or an adhesive tape on a portion in which the cover case 4700 and the cap plate 310 contact, but such combination is not limited thereto.

As described above, the secondary battery according to aspects of the present invention produces the following and/or other effects: first, the conducting support member is seated in the groove formed in the cap plate, and then the protection circuit board is electrically and mechanically connected, thereby allowing the protection circuit board to be exactly connected at a predetermined position of the cap plate. Second, the conducting support member is seated in the groove formed in the cap plate, thereby improving strength of the coupling between the cap plate and the conducting support member. Third, the cover case is combined with the can so as to cover the protection circuit board and conducting support member, thereby insulating the protection circuit board and conducting support member from the exterior.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A secondary battery, comprising:
 an electrode assembly including:
  a cathode plate,
  an anode plate, and
  a separator disposed to insulate the cathode plate from the anode plate,
  wherein the cathode plate, the anode plate, and the separator are wound together;
 a can to house the electrode assembly and having an opened end;
 a cap assembly including:
  a cap plate to seal the opened end of the can and having grooves formed therein disposed at opposing ends of the cap plate, and
  an electrode terminal disposed to extend through the cap assembly and to electrically connect to the anode plate, the electrode terminal being insulated from the cap plate;
 a protection circuit board electrically coupled to the electrode terminal and having a charging/discharging terminal on an upper surface thereof;
 a conducting support member connected to one of the grooves formed in the cap plate and soldered to the protection circuit board; and
 a combining member connected to and covering a hole formed in the middle of the protection circuit board, the combining member contacting only the surface of the protection circuit board facing the electrode terminal and being electrically connected to the electrode terminal.

2. The secondary battery of claim 1, wherein a height of the conducting support member is greater than a sum of heights of the combining member and electrode terminal.

3. The secondary battery of claim 1 wherein a height of the conducting support member from a bottom surface of the groove formed in the cap plate is the same as a sum of heights of the combining member and electrode terminal.

4. The secondary battery of claim 1, wherein the combining member is electrically connected to an upper surface of the protection circuit board by soldering and extends through the hole to electrically connect to the electrode terminal.

5. The secondary battery of claim 1, wherein the combining member is electrically connected to a bottom surface of the protection circuit board.

6. The secondary battery of claim 1, wherein the combining member includes lead receiving holes.

7. The secondary battery of claim 1, wherein the conducting support member comprises:
 a first region connected to the protection circuit board;
 a second region bent and extended from the first region in a direction away from the protection circuit board; and
 a third region extended and bent from the second region and connected to the groove of the cap plate.

8. The secondary battery of claim 7, wherein the first region of the conducting support member is bent to be substantially parallel with the protection circuit board in a first direction from the second region, and the third region is bent to be substantially parallel with the protection circuit board in a second direction from the second region opposite to the first direction.

9. The secondary battery of claim 8, wherein the first direction is toward a center of the protection circuit board away from the second region, and the second direction is toward a periphery of the cap plate away from the second region.

10. The secondary battery of claim 7, wherein the third region of the conducting support member is rectangular or arc shape.

11. The secondary battery of claim 1, wherein the conducting support member is made of nickel or nickel-containing alloy.

12. The secondary battery of claim 1, wherein a laser welding part is formed in the conducting support member connected to the groove.

13. The secondary battery of claim 12, wherein the laser welding part includes plural spots on an upper surface of the conducting support member seated in the groove.

14. The secondary battery of claim 1, wherein the groove formed in the cap plate has a rectangular or a semi-circular shape.

15. The secondary battery of claim 1, further comprising a cover case comprising a charging/discharging terminal hole to expose the charging/discharging terminal, the cover case being combined with the can to cover the protection circuit board and conducting support member.

16. The secondary battery of claim 15, wherein the protection circuit board further comprises a test terminal electrically coupled with the printed circuit pattern to allow determination of whether the charging/discharging function or the protection circuit is normally operated, and the cover case further includes a test terminal hole to expose the test terminal.

17. The secondary battery of claim 1, further comprising a nonconducting support member connected between the other one of the grooves formed in the cap plate and the protection circuit board.

18. A secondary battery, comprising:
 an electrode assembly including:
  a cathode plate, an anode plate, and
a separator disposed to insulate the cathode plate from the anode plate,
wherein the cathode plate, the anode plate, and the separator are wound together;
a cap assembly including:
a can with at least one opened end;
a cap plate to seal the opened end of the can and having grooves formed therein disposed at opposing ends of the cap plate, and
an electrode terminal disposed to extend through the cap assembly and to electrically connect to the anode plate, the electrode terminal being insulated from the cap plate;
a protection circuit board electrically coupled to the electrode terminal and having a charging/discharging terminal on an upper surface thereof;
support members disposed between the grooves of the cap plate and the protection circuit board, at least one of the support members electrically connecting the cathode plate to the charging/discharging terminal; and
a combining member connected to and covering a hole formed in the middle of the protection circuit board, the combining member contacting only the surface of the protection circuit board facing the electrode terminal and being electrically connected to the electrode terminal
wherein the support members are bent to provide spaces above the grooves formed in the cap plate to facilitate vertical welding of the support members to the grooves.

19. The secondary battery of claim 18, wherein the support members comprise:
a first region connected to the protection circuit board;
a second region bent and extended from the first region in a direction away from the protection circuit board; and
a third region extended and bent from the second region and connected to the groove of the cap plate,
wherein the first region is disposed in a direction away from the second region toward a center of the protection circuit board, and the third region is disposed in a direction away from the second region toward a periphery of the cap plate.

* * * * *